US012326298B2

(12) United States Patent
MacKay et al.

(10) Patent No.: US 12,326,298 B2
(45) Date of Patent: Jun. 10, 2025

(54) FREEZE-DRYING SYSTEMS AND METHODS

(71) Applicant: DSM Sales & Manufacturing, Inc., Salt Lake City, UT (US)

(72) Inventors: Douglas S. MacKay, Draper, UT (US); Zakary D. MacKay, Saratoga Springs, UT (US); Nicholas S. MacKay, Saratoga Springs, UT (US)

(73) Assignee: DSM Sales & Manufacturing, Inc., Salt Lake City, UT (US)

( * ) Notice: Subject to any disclaimer, the term of this patent is extended or adjusted under 35 U.S.C. 154(b) by 0 days.

(21) Appl. No.: 18/617,473

(22) Filed: Mar. 26, 2024

(65) Prior Publication Data

US 2024/0230225 A1 Jul. 11, 2024

Related U.S. Application Data

(62) Division of application No. 17/451,576, filed on Oct. 20, 2021, now Pat. No. 12,085,337.

(51) Int. Cl.

*F26B 5/06* (2006.01)
*F26B 21/08* (2006.01)
*F26B 21/10* (2006.01)

(52) U.S. Cl.

CPC ................ *F26B 5/06* (2013.01); *F26B 21/08* (2013.01); *F26B 21/10* (2013.01)

(58) Field of Classification Search

CPC ............. F26B 5/06; F26B 21/08; F26B 21/10
USPC .......................................................... 34/289
See application file for complete search history.

(56) References Cited

U.S. PATENT DOCUMENTS 3,233,333 A * 2/1966 Oppenheimer ........... F26B 5/06 34/292
3,264,747 A 8/1966 Manuel
3,964,174 A 6/1976 King
6,968,631 B1 11/2005 Kuhn et al.
7,370,436 B2 * 5/2008 Auer ......................... A23L 3/44 34/287
8,407,912 B2 * 4/2013 Hubbard, Jr. ............. F26B 3/12 424/159.1
8,516,714 B2 8/2013 Biemans et al.
D694,294 S 11/2013 Roberson
8,677,649 B2 3/2014 Bottger et al.
(Continued)

FOREIGN PATENT DOCUMENTS

CA 2849790 A1 4/2013
CN 201615678 U 10/2010
(Continued)

*Primary Examiner* — Stephen M Gravini
(74) *Attorney, Agent, or Firm* — Stoel Rives LLP

(57) ABSTRACT

Devices, systems, and methods used to freeze dry a substance are disclosed. The devices and systems include a freeze dryer including a freeze-drying chamber, heating members, a refrigeration system, a vacuum pump, and a plurality of sensors disposed within the freeze-drying chamber. The freeze-drying methods include four main phases of freeze drying a substance: Phase 1—Freezing; Phase 2—Vacuum Freezing; Phase 3—Sublimation; Phase 3A—Sublimation Verification and Phase 4—Final Drying. Phase 3 can include cycling the heating members on and off between upper and lower humidity thresholds to increase the temperature of the freeze-drying chamber.

19 Claims, 5 Drawing Sheets

(56) References Cited

U.S. PATENT DOCUMENTS

| | | | | |
|---|---|---|---|---|
| 8,793,895 | B2 * | 8/2014 | Gasteyer, III | A61P 37/04 34/287 |
| 9,347,707 | B2 | 5/2016 | Struschka et al. | |
| 9,459,044 | B1 | 10/2016 | Haddock et al. | |
| 9,920,989 | B2 | 3/2018 | Luy et al. | |
| 10,113,797 | B2 * | 10/2018 | Dern | A61K 9/19 |
| 10,627,162 | B2 | 4/2020 | Delaveau | |
| D895,696 | S | 9/2020 | Buter et al. | |
| 10,809,003 | B2 | 10/2020 | De Beer et al. | |
| 10,900,713 | B2 * | 1/2021 | Gong | F25B 40/06 |
| D944,871 | S | 3/2022 | Di-Rosa et al. | |
| D944,872 | S | 3/2022 | Di-Rosa et al. | |
| 11,391,513 | B2 * | 7/2022 | Sabarez | A23L 3/54 |
| D968,905 | S | 11/2022 | Cruver et al. | |
| D976,290 | S | 1/2023 | Ye | |
| 11,781,811 | B2 | 10/2023 | Knight | |
| D1,006,842 | S | 12/2023 | Zhou et al. | |
| 11,841,189 | B1 * | 12/2023 | Andrews | F26B 21/12 |
| 11,998,861 | B2 * | 6/2024 | Andrews | B01D 1/18 |
| 12,109,311 | B2 * | 10/2024 | Slocum | F26B 5/06 |
| 2008/0276482 | A1 * | 11/2008 | Broughall | F26B 5/06 34/92 |
| 2016/0295902 | A1 | 10/2016 | Kingdon | |
| 2022/0062180 | A1 * | 3/2022 | Slocum | H02N 15/00 |
| 2023/0122361 | A1 | 4/2023 | Mackay et al. | |
| 2023/0324118 | A1 | 10/2023 | Lennon-Meyer et al. | |
| 2024/0230225 | A1 * | 7/2024 | MacKay | F26B 5/06 |

FOREIGN PATENT DOCUMENTS

| | | | | | |
|---|---|---|---|---|---|
| CN | 202456318 | U | | 10/2012 | |
| CN | 105767138 | B | | 7/2016 | |
| CN | 108294219 | A | | 7/2018 | |
| CN | 108567095 | A | | 9/2018 | |
| CN | 108592527 | B | | 9/2018 | |
| CN | 108850129 | A | | 11/2018 | |
| CN | 208794849 | U | | 4/2019 | |
| CN | 211932367 | U | | 11/2020 | |
| EP | 3443286 | B1 | | 1/2021 | |
| EP | 4293305 | A1 | * | 12/2023 | F26B 25/001 |
| GB | 1053012 | A | * | 8/2016 | |
| JP | 2010266086 | A | | 11/2010 | |
| KR | 101283501 | B1 | | 7/2013 | |
| KR | 20140091541 | A | | 7/2014 | |
| KR | 100718201 | B1 | | 5/2017 | |
| WO | 2010134953 | A1 | | 11/2010 | |
| WO | 2011120342 | A1 | | 10/2011 | |
| WO | 2017178740 | A1 | | 10/2017 | |
| WO | WO-2019014338 | A1 | * | 1/2019 | A61K 39/12 |
| WO | WO-2021207159 | A1 | * | 10/2021 | F26B 15/18 |
| WO | WO-2022046273 | A1 | * | 3/2022 | A61K 9/19 |

* cited by examiner

FREEZE-DRYING SYSTEMS AND METHODS

RELATED APPLICATIONS

This application claims priority to U.S. patent application Ser. No. 17/451,576, filed Oct. 20, 2021 and titled FREEZE-DRYING SYSTEMS AND METHODS, which is incorporated herein by reference in its entirety.

TECHNICAL FIELD

The present disclosure relates generally to devices used to freeze dry substances. More specifically, the present disclosure relates to freeze-drying systems and methods used to freeze dry a substance using a moisture sensor to control the freeze-drying process.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
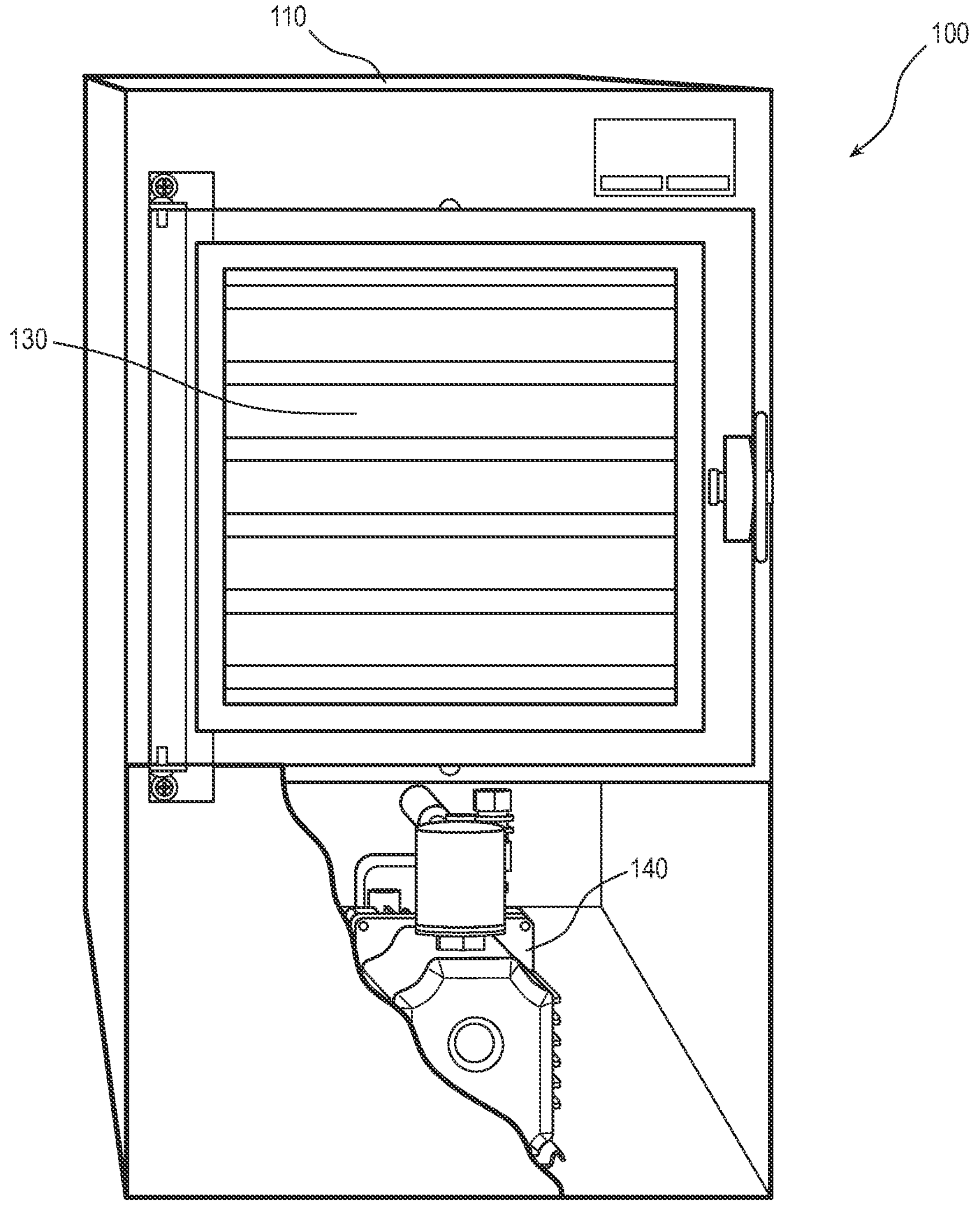
FIG. 1 is a front view of an embodiment of a freeze dryer.

The technique of "freeze drying," also known as lyophilization, is a process used on a perishable material (e.g., pharmaceutical products or food products) to make the material more convenient for storage, distribution, and/or transport. During the freeze-drying process, water is removed from a composition after it is frozen and placed under a vacuum, allowing the ice to change directly from a solid to a vapor state, without passing through a liquid state. The process comprises four main separate processes: (I) a freezing phase, (II) a vacuum phase, (III) a primary sublimation phase, and (IV) a drying phase (desorption).

A freeze-drying method within the scope of this disclosure includes five main steps: Phase 1—Freezing; Phase 2—Vacuum Freezing; Phase 3A—Sublimation; Phase 3B—Sublimation Verification; and Phase 4—Final Drying. A substance is placed into a freeze dryer that includes a cabinet, a freeze-drying chamber, a controller, a refrigeration system, a vacuum pump, a condensation member, and a humidity sensor and a vacuum pressure sensor disposed within the freeze-drying chamber. Phase 1 is initiated to cool the freeze-drying chamber to about zero degrees Fahrenheit (F). Phase 2 is initiated to draw a vacuum within the freeze-drying chamber of at least 500 microns of mercury (Hg) and wherein the temperature of the freeze-drying chamber is about minus 27 degrees F.

Phase 3A is initiated wherein heating members are cycled on and off by the controller to slowly raise the temperature of the freeze-drying chamber and the substance. The chamber temperature is raised to about 130 degrees F. during Phase 3A. As the chamber temperature is raised to a first predetermined temperature, the humidity sensor and the vacuum pressure sensor are sampled by the controller as the chamber temperature and the vacuum pressure rise. As the vacuum pressure passes through an upper vacuum pressure point within an operating vacuum pressure band, the humidity sensor is sampled by the controller to set an initial lower humidity threshold. When the chamber temperature reaches the first predetermined temperature, the heaters are turned off and the chamber cools to a second predetermined temperature. As the chamber temperature decreases, the vacuum pressure also decreases. As the vacuum pressure passes through a lower vacuum pressure point within the operating vacuum pressure band, the humidity sensor is sampled by the controller and an initial upper humidity threshold is set. The chamber continues to cool until the second predetermined chamber temperature is achieved. Upon reaching the second predetermined chamber temperature and setting the upper humidity threshold value, the heaters are turned on and the chamber temperature rises until the lower humidity threshold is met. The process continues to cycle the heaters on and off. With each cycle, the heaters are on until a lower humidity threshold is reached and turned off until an upper humidity threshold is reached. With the reaching of each lower humidity threshold and upper humidity threshold, the controller utilizes an algorithm to calculate a succeeding lower humidity threshold and upper humidity threshold as the moisture in the substance is removed through the sublimation process.

Phase 3A is initiated when the chamber temperature reaches about 130 degrees F. During Phase 3A the heaters are cycled on and off such that the chamber temperature cycles between about 115 degrees F. and about 130 degrees F. and the vacuum pressure remains within the operating vacuum pressure band over a set period of time (e.g., about 90 minutes) as the humidity within the chamber approaches 0%.

Phase 4 is initiated following the set period of time and not reaching a lower humidity threshold value. During Phase 4, the controller cycles the heaters on and off to cycle the chamber temperature between 115 degrees F. and 130 degrees F. for a period of time ranging from about 240 minutes to about 600 minutes.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

Figure 2A:
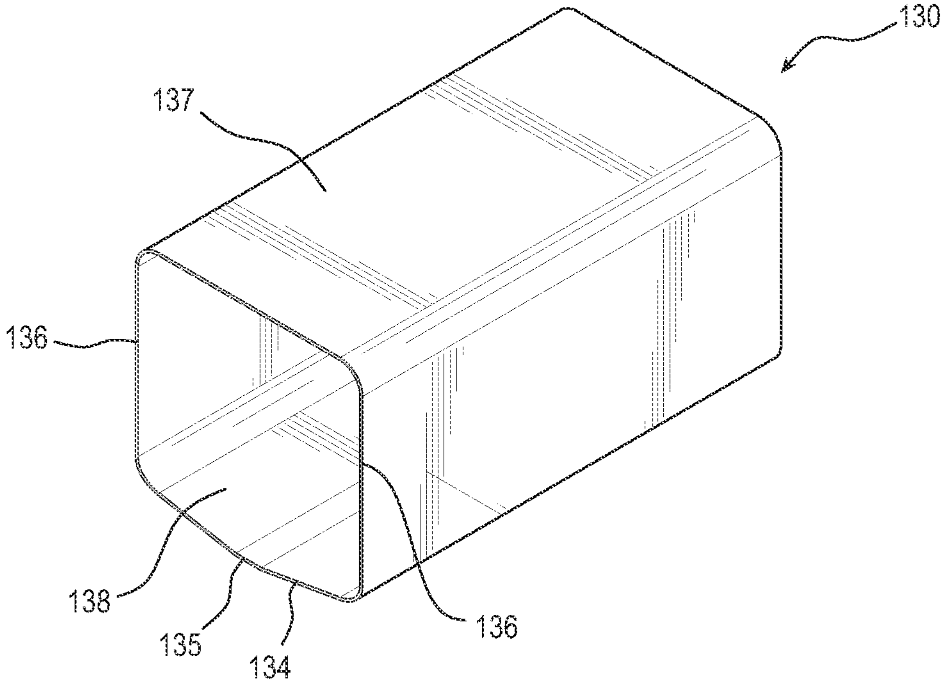
FIG. 2A is a perspective view of an embodiment of a freeze-drying chamber of the freeze dryer of FIG. 1.
Figure 2B:
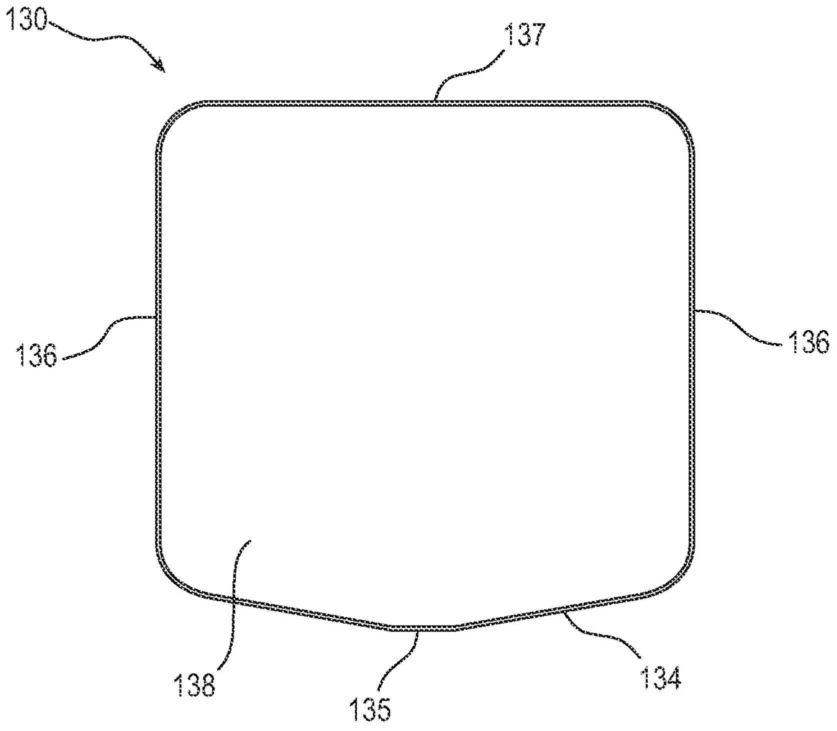
FIG. 2B is an end view of the freeze-drying chamber of FIG. 2A.
Figure 3:
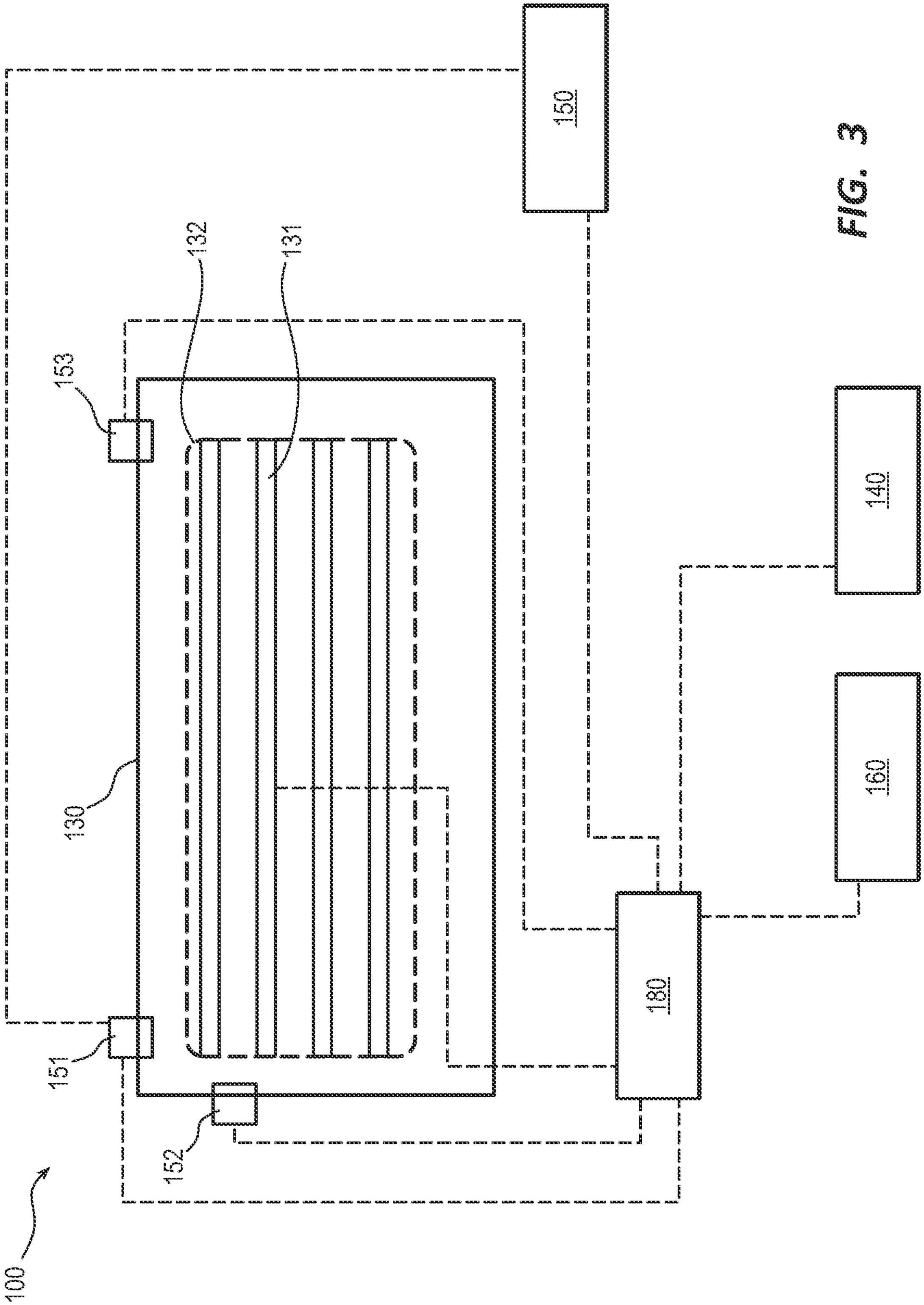
FIG. 3 is a schematic of electrical components of the freeze dryer of FIG. 1.
Figure 4:
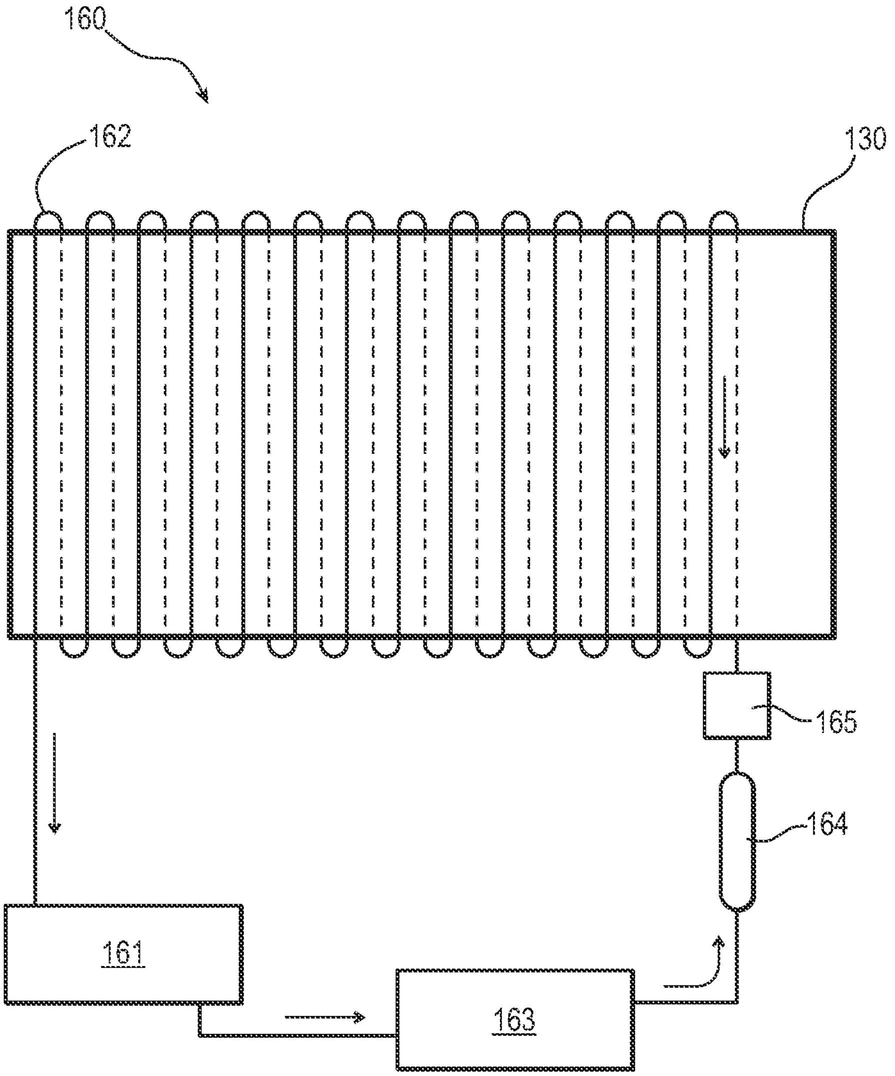
FIG. 4 is a schematic of a refrigeration system of the freeze dryer of FIG. 1.
Figure 5:
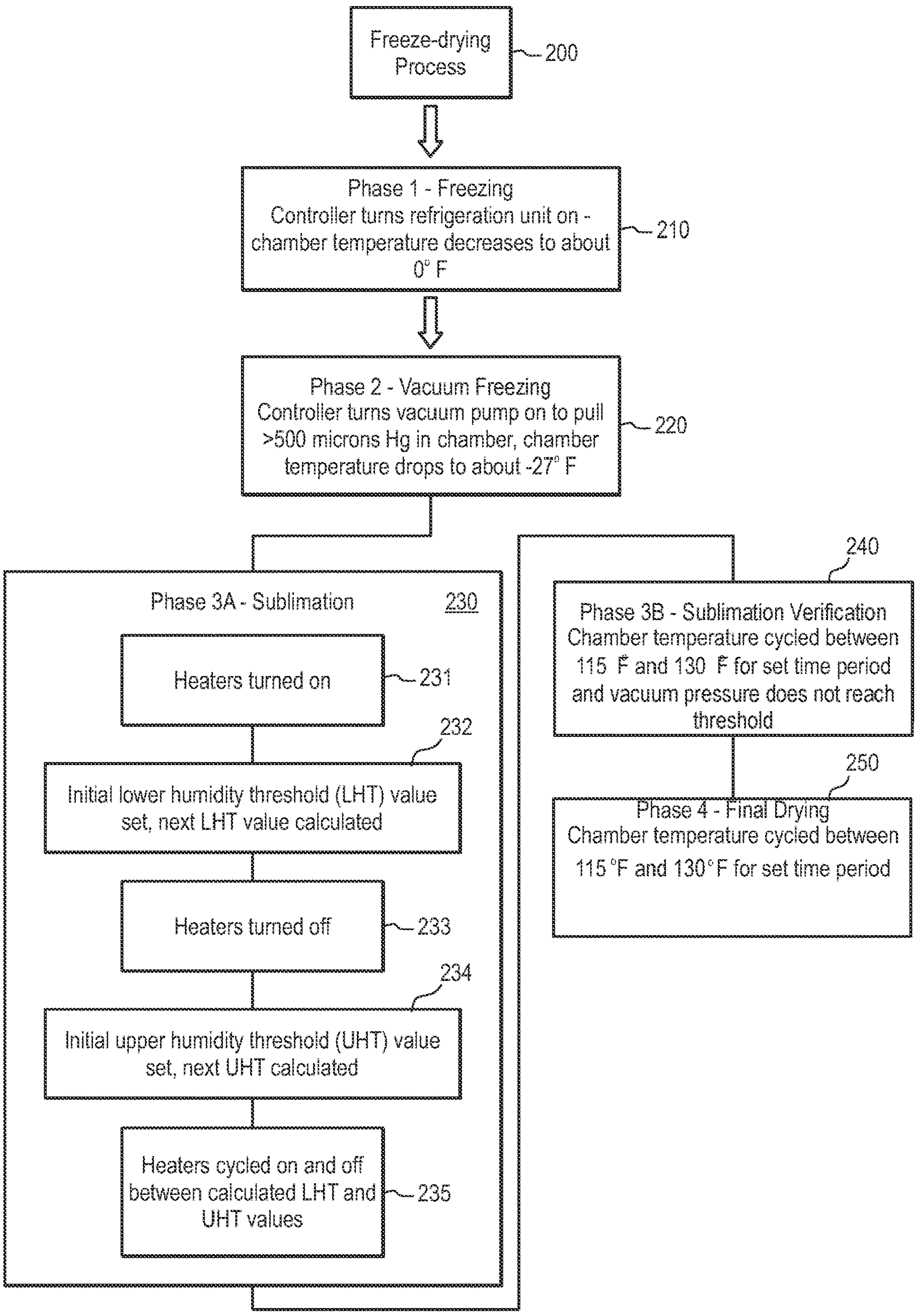
FIG. 5 is a flow chart of an embodiment of a freeze-drying process.

FIG. 1 illustrates an embodiment of a freeze dryer. FIGS. 2A and 2B illustrates an embodiment of a freeze-drying chamber. FIG. 3 schematically illustrates electrical components of the freeze dryer. FIG. 4 schematically illustrates a refrigeration system of the freeze dryer. FIG. 5 illustrates a freeze-drying process. In certain views, each device may be coupled to, or shown with, additional components not included in every view. Further, in some views, only selected components are illustrated, to provide detail into the relationship of the components. Some components may be shown in multiple views, but not discussed in connection with every view. Disclosure provided in connection with any figure is relevant and applicable to disclosure provided in connection with any other figure or embodiment.

As illustrated in FIG. 1, the freeze dryer 100 includes a cabinet 110 including a freeze-drying chamber 130 and a vacuum pump 140. The freeze dryer 100 may be configured for commercial or home applications. The freeze dryer 100 can be configured to freeze dry any suitable substance. For example, the freeze dryer 100 can be configured to process food for long-term storage, medicines, herbs, soil, plants, insects, etc. The cabinet 110 can be of any suitable size. For example, in one embodiment the cabinet 110 may be sized to fit on a kitchen countertop. In another embodiment, the cabinet 110 may be sized to stand on a floor of a food processing factory. The cabinet 110 may include a door 133 to hermetically seal the freeze-drying chamber 130. In the illustrated embodiment of FIG. 1, the vacuum pump 140 is disposed inside of the cabinet 110 to reduce the size of the footprint of the freeze dryer 100. In another embodiment, the vacuum pump 140 can be disposed outside of the cabinet 110 to facilitate maintenance of the vacuum pump 140.

As depicted in FIGS. 2A and 2B, in certain embodiments, the freeze-drying chamber 130 can be substantially square shaped in cross-section. In other embodiments, the freeze-drying chamber 130 may be substantially round in cross-section. The freeze-drying chamber 130 may be sized to freeze dry substances for both home and industrial applications. For example, the freeze-drying chamber 130 may be sized to hold from about 10 pounds to about 14 pounds of the substance. The depicted freeze-drying chamber 130 includes a bottom wall 134, side walls 136, and a top wall 137 defining a cavity 138. The dimensions of the walls, 134, 136, 137 are substantially equivalent with a length dimension being greater than a width dimension A thickness of the material of the walls may range from about 1.6 millimeters to about 2.2 millimeters and may be about 1.9 millimeters. The bottom wall 134 may include a longitudinal trough 135. The trough 135 may collect fluid (e.g., water) that has melted form the walls 134, 136, 137 of the freeze-drying chamber 130 and direct the fluid to a collection reservoir outside of the freeze-drying chamber 130. The freeze-drying chamber 130 may be formed from any rigid suitable material, such as stainless steel. Other food safe and corrosion resistant materials are contemplated.

As illustrated in FIG. 3, the freeze dryer 100 includes the freeze-drying chamber 130, the vacuum pump 140, a controller 150, a refrigeration system 160, and a relay board or module 180. One, two, three, four, or more trays or racks 132 may be horizontally disposed within the freeze-drying chamber 130. The trays 132 can be configured to support a substance (e.g., food) during a freeze-drying process. The trays 132 can be made from any suitable material configured to be heat conductive and to be easily cleaned following the freeze-drying process. For example, the trays 132 may include one of stainless steel and aluminum. Other materials are also contemplated.

The vacuum pump 140 is in fluid communication with the freeze-drying chamber 130 to draw a vacuum pressure within the freeze-drying chamber 130. The vacuum pump 140 can be of any suitable type capable of drawing a vacuum within the freeze-drying chamber 130 ranging from about one micron of Hg to about 1,000 microns of Hg. For example, the vacuum pump 140 can be a single phase or a double phase pump. In some embodiments, the vacuum pump 140 may be oil-free.

Heating members 131 can be disposed within the freeze-drying chamber 130 adjacent the trays 132 to heat the freeze-drying chamber 130 and the substance disposed on the trays 132. The number of heating members 131 may be equivalent to the number of trays 132. In certain embodiments, the heating members 131 may be conductive heating pads wherein the conductive heating pads are in contact with the trays 132 to transmit heat directly from the conductive heating pads to the trays 132. In other embodiments, the heating members 131 may be radiant heaters wherein a space separates the radiant heaters from the trays 132 and heat is transmitted to the trays 132 through the space.

As illustrated in FIG. 4, the refrigeration system 160 is coupled to the freeze-drying chamber 130 to cool the freeze-drying chamber to temperatures needed to freeze dry the substance. For example, the refrigeration system 160 can cool the freeze-drying chamber 130 to a temperature of about minus 40 degrees F. at atmospheric pressure. The refrigeration system 160, as shown, includes a compressor 161, a freezing coil 162, a condenser 163, a filter dryer 164, and a metering device 165. The freezing coil 162 can be wrapped around at least a portion of the freeze-drying chamber 130 in order to cool the freeze-drying chamber 130 to a temperature suitable for freeze drying the substance. The cooling capacity of the refrigeration system 160 can range from about 0.3 kilowatts (kW) to about 0.6 kW. In some embodiments, the refrigeration system 160 may be disposed within the cabinet 110.

In use, a suitable refrigerant is circulated through the refrigeration system 160 as shown by the arrows of FIG. 4. Any suitable refrigerant that has a boiling point below the target freeze-drying temperature, a high heat of vaporization, a moderate density in liquid form, a relatively high density in gaseous form, and a high critical temperature may be used. For example, the refrigerant may be any one of difluoromethane (R-152a); a mixture of difluoromethane, pentafluoroethane, and 1,1,1,2-tetrafluoroethane (R407c); a mixture of difluoromethane and pentafluoroethane (R410a), and 1,1,1,2-tetrafluoroethane (R134a). Other refrigerants are contemplated within the scope of this disclosure.

The refrigerant passes through the compressor 161 where it is compressed into a vapor having a high temperature and pressure. The refrigerant circulates to the condenser 163 where it transitions from a vapor state to a liquid state and loses some heat through convection. The refrigerant is dried as it passes through the filter dryer 164. The refrigerant passes through the metering device 165. The metering device 165 may include a relatively small aperture to control the volume of refrigerant passing through the metering device 165. The refrigerant passes into the freezing coil 162 where it boils and transitions to a low pressure, low temperature vapor/liquid mixture. As the refrigerant passes through the freezing coil 162, cold is transferred to the freeze-drying chamber 130 to cool the freeze-drying chamber 130 as heat is transferred to the refrigerant from the freeze-drying chamber 130. When the refrigerant leaves the freezing coil 162 and re-enters the compressor 161, the refrigerant is in a low pressure, low temperature vapor state.

Referring to FIG. 3, the controller 150 may be electrically coupled to the vacuum pump 140, the refrigeration system 160, a humidity sensor 151, a vacuum sensor 152, and a temperature sensor 153 through the relay board or module 180. The controller 150 can be of any suitable type capable of activating and deactivating the vacuum pump 140 and the refrigeration system 160, receiving data from the sensors 151, 152, 153, executing commands of a stored freeze-drying process program, being user programmable, and calculating humidity threshold values, which will be described below. Other controller functions are contemplated. The controller 150 can be any one of a human machine interface (HMI controller), a feedback controller, and a programmable logic controller. Other types of controllers are contemplated. The controller 150 may include a user input panel and a display panel. The relay board 180 can be configured for data acquisition (DAQ) from the vacuum pump 140, the controller 150, the sensors 151, 152, 153, and the refrigeration system 160.

The humidity sensor 151 is disposed within the freeze-drying chamber 130 adjacent the trays 132 wherein the humidity sensor 151 is in proximity to the substance. The humidity sensor 151 can be of any suitable type capable of measuring moisture within the freeze-drying chamber 130. The humidity sensor 151 may be any one of a capacitive sensor, a resistive sensor, and a thermal sensor. Other types of humidity sensors are contemplated.

The vacuum sensor 152 is disposed within the freeze-drying chamber 130 to measure a vacuum pressure within the freeze-drying chamber 130. The vacuum sensor 152 can be of any suitable type capable of measuring a vacuum pressure of from about 1 micron Hg to about 15,000 microns of Hg and from about 1 micron Hg to about 760,000 micons Hg. The vacuum sensor 152 may be any one of a thermocouple, a resistive sensor, an infrared sensor, a bimetallic sensor, a thermometer, a change-of-state sensor, and a silicone diode sensor. Other types of temperature sensors are contemplated.

The temperature sensor 153 is disposed within the freeze-drying chamber 130 to measure a temperature within the freeze-drying chamber 130. The temperature sensor 153 can be of any suitable type capable of measuring a temperature ranging from about minus 40 degrees F. to about 160 degrees F. The temperature sensor 153 may be any one of a resistive sensor, a capacitive sensor, a piezoelectric sensor, an optical sensor, and a micro electro-mechanical system sensor. Other types of temperature sensors are contemplated.

FIG. 5 illustrates the steps of a freeze-drying process or cycle 200. As shown, the freeze-drying process 200 includes five process phases: Phase 1—Freezing 210, Phase 2—Vacuum Freezing 220, Phase 3A—Sublimation 230, Phase 3B Sublimation Verification 240, and Phase 4—Final Drying 250.

Phase 1 210 is initiated following loading of the substance to be freeze dried onto the trays, loading the trays into the freeze-drying chamber, and hermetically sealing the freeze-drying chamber. During Phase 1 210, the controller may activate the refrigeration unit to cool the freeze-drying chamber to a first chamber temperature ranging from about minus five degrees F. to about five degrees F. and including about zero degrees F. The refrigeration unit can run through Phase 1 210, Phase 2 220, Phase 3A 230, Phase 3B 240, and Phase 4 250 of the freeze-drying process 200.

When the temperature of the freeze-drying chamber reaches the first chamber temperature, the freeze-drying process 200 may transition to Phase 2 220. The controller may activate the vacuum pump to at least partially evacuate the freeze-drying chamber of air and draw a target vacuum pressure of less than about 500 microns of Hg. The vacuum pump can run through Phase 2 220, Phase 3A 230, Phase 3B 240, and Phase 4 250 of the freeze-drying process 200. In some embodiments, if the vacuum pressure within the freeze-drying chamber does not reach from about 480 microns of Hg to about 1000 microns Hg, the controller may turn the vacuum pump off and display a message for the user to check the seal of the door of the freeze-drying chamber. In other embodiments, if the vacuum pressure within the freeze-drying chamber does not reach from about 480 microns of Hg to about 1000 microns Hg, the controller may turn the vacuum pump off and display a message for the user to check the vacuum pump for oil. When the target vacuum is achieved, the chamber temperature can be about minus 27 degrees F.

When the target vacuum pressure is achieved, the freeze-drying process 200 may transition to Phase 3A 230. During Phase 3A 230, the controller can cyclically turn the heating members on and off to slowly raise the temperature of the freeze-drying chamber and the substance resulting in sublimation or phase transition of the frozen water within the substance from ice to water vapor. As the chamber temperature rises, the frozen water within the substance can be sublimated and leave the substance as water vapor. Sublimation is defined within the scope of this disclosure as the transition of water from a frozen state directly to a vapor state without a transition to a liquid state. When the frozen water within the substance is sublimated, the water vapor is freed into the freeze-drying chamber, causing the humidity to rise. The humidity sensor measures the absolute humidity level or amount of water vapor or moisture in the chamber and transmits the data to the controller. The controller can utilize the humidity level to determine and set a lower humidity threshold and an upper humidity threshold within an operating vacuum pressure band.

The heating members can be turned on 231 such that the chamber temperature rises and the vacuum pressure within the chamber rises. The vacuum pressure sensor measures the rising vacuum pressure and provides data to the controller. The controller compares the received vacuum pressure data to a pre-set upper vacuum pressure point within the operating vacuum pressure band at a frequency of about five seconds to about two minutes and may be about 30 seconds. The pre-set upper vacuum pressure point may range from about 575 microns of Hg to about 750 microns of Hg. The operating vacuum pressure band may include a maximum vacuum pressure and a minimum vacuum pressure. The maximum vacuum pressure may be about 700 microns of Hg, and the minimum vacuum pressure may be about 480 microns of Hg. When the measured vacuum pressure passes through the upper vacuum pressure point, the controller utilizes the measured humidity level to set an initial lower humidity threshold value 232. The initial lower humidity threshold value can range from about 5% to about 40%. The heaters can continue to heat until the chamber reaches a predetermined maximum temperature (e.g., about eighty degrees above the minus 27 degree F. chamber temperature achieved during Phase 2 220). If the chamber temperature has reached the predetermined temperature and the lower humidity threshold value has been set, the controller may turn off the heaters 233 and the chamber will begin to cool.

As the chamber temperature decreases, the vacuum pressure within the chamber decreases. The vacuum pressure sensor measures the decreasing vacuum pressure and provides data to the controller. The controller compares the received vacuum pressure data to a predetermined lower vacuum point within the operating vacuum pressure band about every two minutes. When the vacuum pressure passes through the lower vacuum pressure point, the controller utilizes the measured humidity value to set an initial upper humidity threshold value 234. The lower vacuum pressure point can range from about 480 microns of Hg to about 525 microns of Hg. The initial upper humidity threshold value can range from about 25% to about 80%.

Following the setting of the initial upper and lower humidity threshold values, the controller can continue to cycle the heaters on and off to heat and cool the chamber and the substance to cause further sublimation of additional water within the substance. The heaters can be turned on until the lower humidity threshold value is reached and can be turned off until the upper humidity threshold value is reached. In other words, the cyclic turning off and on of the heaters is driven by reaching of the lower humidity threshold value and the upper humidity threshold value, respectively. Each time the upper humidity threshold value and the lower humidity threshold value are reached, the controller may utilize a stored algorithm to calculate the next upper humidity threshold value and lower humidity threshold value 235. In other words, the upper humidity threshold value and the lower humidity threshold value may change following each heating and cooling cycle.

With each heating and cooling cycle, the humidity level can progressively decrease due to a decreasing water volume within the substance being released into the chamber as water vapor. When the water vapor is released into the chamber, it is drawn to the wall of the chamber where it condensates and freezes. Thus, the water vapor in the chamber becomes unavailable to return to the substance when it becomes frozen ice crystals on the wall of the chamber. With each cycle the releasable water within the substance is decreased resulting in lowering humidity levels that will approach 0%. Phase 3A 230 can be completed when the chamber temperature reaches 130 degrees F.

Phase 3B 240 may be initiated when the chamber temperature reaches 130 degrees F. Phase 3B 240 may be configured to verify that a sufficient about of sublimation has occurred during Phase 3A 230. During Phase 3B 240, the controller may cycle the heaters on and off such that the chamber temperature cycles between 115 degrees F. and 130 degrees F. for about 90 minutes. If the vacuum pressure does not rise above a threshold vacuum pressure within the 90 minutes, the freeze-drying process 200 transitions to Phase 4 250. The threshold vacuum pressure may range from about 500 microns of Hg to about 700 microns of Hg and may be about 575 microns of Hg.

Phase 4 250 may be configured to further dry the substance. During Phase 4 250 the controller may cycle the heaters on and off such that the chamber temperature cycles between about 115 degrees F. and about 130 degrees F. over a set time of between about 240 minutes and about 600 minutes. At the end of the set time, the humidity level of the chamber may range between about 0% and 1.5%.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified. For example, a method of freeze drying a substance may include one or more of the following steps: sublimating water contained within the substance comprising: turning on freeze dryer heating members to increase a temperature of a freeze-drying chamber; increasing a vacuum pressure within the freeze-drying chamber to an upper vacuum pressure point within an operating vacuum pressure band; measuring a humidity level within the freeze-drying chamber; setting a lower humidity threshold value as the vacuum pressure within the freeze-drying chamber passes through the upper vacuum pressure point; turning off the freeze dryer heating members when the upper humidity threshold value is set to cool the freeze-drying chamber; decreasing the vacuum pressure within the freeze-drying chamber to a lower vacuum pressure point within the operating vacuum pressure band; setting an upper humidity threshold value as the vacuum pressure within the freeze-drying chamber passes through the lower vacuum pressure point; and turning the heaters on to increase the freeze-drying chamber temperature when the upper humidity threshold value is set. Other steps are also contemplated.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment.

It will be appreciated that various features are sometimes grouped together in a single embodiment, figure, or description thereof for the purpose of streamlining the disclosure. Many of these features may be used alone and/or in combination with one another.

The phrases "coupled to" and "in communication with" refer to any form of interaction between two or more entities, including mechanical, electrical, magnetic, electromagnetic, fluid, and thermal interaction. Two components may be coupled to or in communication with each other even though they are not in direct contact with each other. For example, two components may be coupled to or in communication with each other through an intermediate component.

References to approximations are made throughout this specification, such as by use of the term "about." For each such reference, it is to be understood that, in some embodiments, the value, feature, or characteristic may be specified without approximation. For example, where the qualifier such as "about" is used, these terms include within their scope the qualified words in the absence of their qualifiers.

The terms "a" and "an" can be described as one, but not limited to one. For example, although the disclosure may recite a freeze dryer having "a vacuum pump," the disclosure also contemplates that the freeze dryer can have two or more vacuum pumps.

Unless otherwise stated, all ranges include both endpoints and all numbers between the endpoints.

Recitation in the claims of the term "first" with respect to a feature or element does not necessarily imply the existence of a second or additional such feature or element.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A freeze-drying apparatus, comprising:
- a cabinet;
- a freeze-drying chamber disposed within the cabinet, the freeze-drying chamber including,
  - a top wall,
  - first and second side walls connected to the top wall, and
  - a bottom wall connected to the side walls and including,
    - first and second sections coupled to the first and second sidewalls respectively, the first and second sections including a majority of the surface area of the bottom wall, the first and second sections extending toward each other and downward from the first and second side walls, and
    - a trough connected to the first and second sections and extending longitudinally and parallel to the top wall, the trough adapted to collect fluid melted from the side walls and to convey the collected fluid longitudinally;
- a refrigeration system;
- an oil-free vacuum pump disposed within the cabinet and in fluid communication with the freeze-drying chamber and adapted to draw a vacuum pressure within the freeze-drying chamber; and
- a controller in electrical communication with the refrigeration system and the vacuum pump and adapted to activate and deactivate the refrigeration system and the vacuum pump.

2. The freeze-drying apparatus of claim 1, wherein the freeze-drying chamber comprises a substantially square cross-sectional shape.

3. The freeze-drying apparatus of claim 1, further comprising a collection reservoir in fluid communication with the trough and adapted to collect the fluid melted from the side walls.

4. The freeze-drying apparatus of claim 1, wherein the vacuum pump is adapted to draw a vacuum within the freeze-drying chamber ranging from about one micron of Hg to about 1,000 microns of Hg.

5. The freeze-drying apparatus of claim 1, wherein the vacuum pump is a single phase pump.

6. The freeze-drying apparatus of claim 1, wherein the vacuum pump is a double phase pump.

7. The freeze-drying apparatus of claim 1, further comprising a plurality of trays horizontally disposed within the freeze-drying chamber and adapted to support a food substance.

8. The freeze-drying apparatus of claim 7, further comprising a plurality of heating members disposed within the freeze-drying chamber and adjacent the plurality of trays and adapted to heat the freeze-drying chamber and the food substance.

9. The freeze-drying apparatus of claim 1, further comprising:
- a humidity sensor disposed within the freeze-drying chamber;
- a vacuum pressure sensor disposed within the freeze-drying chamber; and
- a temperature sensor disposed within the freeze-drying chamber, wherein the humidity sensor, the vacuum pressure sensor, and the temperature sensor are in electrical communication with the controller to thereby send data to the controller.

10. A freeze-drying apparatus, comprising:
- a cabinet;
- a freeze-drying chamber disposed within the cabinet and comprising,
  - a top wall,
  - first and second side walls connected to the top wall, and
  - a bottom wall connected to the side walls and including,
    - first and second sections coupled to the first and second sidewalls respectively, the first and second sections including a majority of the surface area of the bottom wall, the first and second sections extending toward each other and downward from the first and second side walls, and
    - a trough coupled to the first and second sidewalls and extending longitudinally and parallel to the top wall, the trough adapted to collect fluid melted from the side walls and to convey the collected fluid longitudinally;
- a refrigeration system;
- an oil-free vacuum pump disposed within the cabinet and in fluid communication with the freeze-drying chamber and adapted to draw a vacuum pressure within the freeze-drying chamber;
- a humidity sensor disposed within the freeze-drying chamber;
- a vacuum pressure sensor disposed within the freeze-drying chamber;
- a temperature sensor disposed within the freeze-drying chamber; and
- a controller in electrical communication with the refrigeration system, the vacuum pump, the humidity sensor, the vacuum pressure sensor, and the temperature sensor and adapted to activate and deactivate the refrigeration system and the vacuum pump.

11. The freeze-drying apparatus of claim 10, wherein the freeze-drying chamber comprises a substantially square cross-sectional shape.

12. The freeze-drying apparatus of claim 10, further comprising a collection reservoir in fluid communication with the trough and adapted to collect the fluid melted from the side walls.

13. The freeze-drying apparatus of claim 10, wherein the vacuum pump is adapted to draw a vacuum within the freeze-drying chamber ranging from about one micron of Hg to about 1,000 microns of Hg.

14. The freeze-drying apparatus of claim 10, wherein the vacuum pump is a single phase pump.

15. The freeze-drying apparatus of claim 10, wherein the vacuum pump is a double phase pump.

16. The freeze-drying apparatus of claim 10, further comprising a plurality of trays horizontally disposed within the freeze-drying chamber and adapted to support a food substance.

17. The freeze-drying apparatus of claim 16, further comprising a plurality of heating members disposed within the freeze-drying chamber and adjacent the plurality of trays and adapted to heat the freeze-drying chamber and the food substance.

18. The freeze-drying apparatus of claim 10, further comprising a relay board in electrical communication between the controller and the vacuum pump and the refrigeration system.

19. The freeze-drying apparatus of claim 18, wherein the relay board is in electrical communication with the humidity sensor, vacuum sensor, and temperature sensor to enable data acquisition.

* * * * *